Patented May 12, 1936

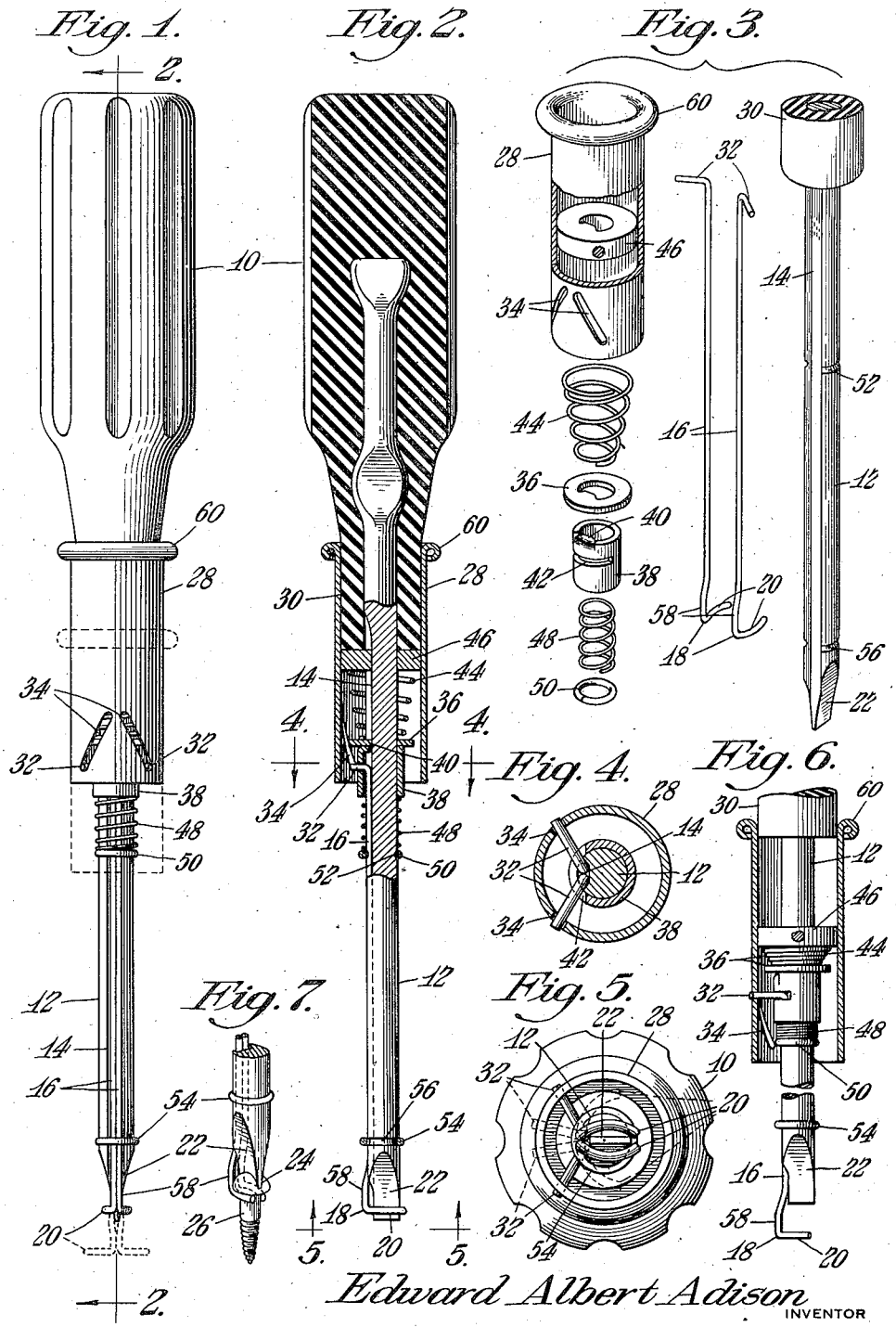

2,040,723

UNITED STATES PATENT OFFICE 2,040,723

SCREW DRIVER

Edward Albert Adison, Chicago, Ill.

Application November 12, 1934, Serial No. 752,783

7 Claims. (Cl. 145—52)

My invention relates to screw drivers, and has among its objects and advantages the provision of improved means for holding a screw or similar article in operative relation with the end of the screw driver, and in which the means are arranged to function as a grip for picking up screws or the like. The invention also embodies means whereby the screw gripping jaws may be retracted to an inoperative position to permit the screw driver to be used in the usual way.

In the accompanying drawing:

Fig. 1 is a view illustrating a screw driver embodying the invention;

Fig. 2 is a sectional view along the line 2—2 of Fig. 1;

Fig. 3 is a perspective view illustrating the parts separated from one another;

Fig. 4 is a sectional view along the line 4—4 of Fig. 2;

Fig. 5 is an end elevation;

Fig. 6 is a sectional view of a portion of the device; and

Fig. 7 is a perspective view illustrating a screw associated with the screw driver.

In the embodiment selected to illustrate my invention, the screw driver comprises a conventional handle 10 and a shank 12 anchored in the handle in any suitable maner. A groove 14 extends longitudinally of the shank 12 for accommodating two wires 16, each having an end bent at 18 to provide a screw gripping jaw 20.

One end of the shank 12 is flattened at 22 to provide the tapered end adapted to enter the slot 24 in the head of the screw 26, see Fig. 7. In Figs. 1 and 2, I illustrate the normal or retracted position of the gripping jaws 20, at which time the screw driver may be operated in the usual way. The jaws 20 lie on opposite sides of the tapered end 22 and are arranged to be projected to a position in advance of the tapered end through the medium of a sleeve 28 slidably mounted on the neck part 30 of the handle. Referring to Figs. 1 and 2, the inner ends of the wires 16 are bent to provide levers 32 projecting through slots 34 in the wall of the sleeve 28.

Upon the shank 12 and within the sleeve 28 I loosely mount a washer 36. This washer lies against a sleeve 38 slidably mounted upon the shank 12, which sleeve is provided with a key 40 lying within the groove 14. The levers 32 project through a slot 42 in the sleeve 38.

I mount a spring 44 upon the shank 12 in abutting relation with the washer 36 with the other end of the spring bearing against a disc 46 positioned within the sleeve 28 and secured thereto as by spot welding. In the normal position of the shank 12, see Fig. 2, the disc 46 lies adjacent the neck 30. A second spring 48 is mounted upon the shank 12 in abutting relation with the outer end of the sleeve 38. This spring is held in place by a wire 50 lying within a small groove 52 in the shank.

In operation, the sleeve 28 is shifted longitudinally of the handle 10 in the direction of the dotted line illustration of Fig. 1. Shifting of the sleeve in this manner shifts the sleeve 38 longitudinally of the shank so that the wires 16 will be shifted longitudinally of the shank 12. The spring 48 offers less resistance to distortion than the spring 44 so that the first shifting of the sleeve 28 shifts the sleeve 38 upon the shank 12, but does not compress the spring 44. Such shifting of the sleeve 38 moves the wires 16 longitudinally of the shank 12 to position the gripping jaws 20 beyond the tapered end 22. After the spring 48 has been compressed, further movement of the sleeve 28 compresses the spring 44.

Since the spring 48 has been completely compressed, further shifting of the sleeve 28 is permitted because of the slots 34 through which the levers 32 project. These slots converge in the direction of each other, see Fig. 1, so that the levers 32 are moved closer together and impart rotary movement to the wires 16. Rotation of these rods separates the gripping jaws 20 to the dotted line position of Fig. 5.

When the gripping jaws 20 are separated, the screw 26 may easily be placed in position for engagement with the tapered end of the shank 12, after which the screw will be firmly held in assembly with the tapered end because of the springs 44 and 48. Not only does the gripping jaws 20 support the screw according to Fig. 7, but the jaws are designed so that articles such as screws and nails may be picked up individually. Because of the fact that separating action is imparted to the gripping jaws only after the jaws have been pushed beyond the tapered end of the shank 12, accommodation is provided for washers or the like in association with the screw 26. At the same time, effective gripping action is attained in connection with screws having relatively thin heads.

I place a second wire ring 54 about the wires 16 near the tapered end 22, which wire ring lies within a groove 56 in the shank 12. In Figs. 2 and 6, I illustrate the wires 16 as being bent to arrange a short reach 58 in offset relation with the portions lying within the groove 14. The offset arrangement provides accommodation for screws having heads large in diameter.

The sleeve 28 may be provided with a bead 60 providing an effective grip for operating the sleeve against the tension of the springs 44 and 48. The arrangement of the sleeve 28 is such that the device may be operated by one hand. In arranging the wires 16 within the groove 14, protection is obtained for the wires. At the same time, the wires are housed within the cross-sectional contour of the shank so that a compact arrangement is attained. The gripping jaws are bowed slightly to increase the gripping relation between the screw and the jaws.

Without further elaboration, the foregoing will so fully explain my invention that others may, by applying current knowledge, readily adapt the same for use under various conditions of service.

I claim:

1. A screw driver comprising a handle, a shank connected with the handle and having a flattened operating end, said shank being grooved longitudinally, a pair of wires lying within said groove and having screw gripping jaws arranged in operative relation with the flattened end, a grip member movably connected with said handle, a mechanical connection between the wires and said grip member for shifting the wires within said groove and projecting the screw gripping jaws beyond said flattened end, and a mechanical connection between the wires and said grip member for rotating the wires to vary the spacing between the screw gripping jaws.

2. A screw driver comprising a handle, a shank connected with the handle and having a flattened operating end, said shank being grooved longitudinally, a pair of wires lying within said groove and having screw gripping jaws arranged in operative relation with the flattened end, a sleeve movably connected with said handle, a mechanical connection between the wires and said sleeve for shifting the wires and projecting the screw gripping jaws beyond said flattened end, and a mechanical connection between the wires and said sleeves for rotating the wires to vary the spacing between the screw gripping jaws.

3. A screw driver comprising a shank, a handle secured to said shank and having a neck, a sleeve loosely mounted on said neck, said shank being grooved, a pair of wires lying within said groove and having screw gripping jaws arranged in operative relation with the end of the shank, and a mechanical connection between the wires and said sleeve for actuating the wires and said screw gripping jaws, said mechanical connection comprising in part levers formed integrally with said wires and projecting through slots in the wall of said sleeve, said slots being arranged in converging relation.

4. A screw driver comprising a shank, a handle secured to said shank, a sleeve movably mounted upon the handle and having a pair of slots arranged in angular relation, a spring mounted upon said shank and housed within said sleeve, a spring of less compressive strength mounted upon said shank in spaced relation with the first-named spring, an abutment separating the springs, said shank being provided with an abutment supporting one end of said second-named spring, said sleeve being provided with an abutment for supporting one end of the first-named spring, said shank being grooved longitudinally, a pair of wires lying within said groove, each wire having one end bent to provide a lever projecting through one of the slots in said sleeve, the other ends of said wires being bent to provide screw gripping jaws arranged in operative relation with a flattened end of the shank, means carried by the shank for holding the wires in operative relation with the shank and within said groove, said wires being slidably arranged in the latter, said wires being shifted longitudinally of the shank upon movement of the sleeve relatively to the handle for positioning the screw gripping jaws in spaced relation with the flattened end of the shank, such movement of the sleeve compressing said second-named spring, further movement of said sleeve compressing the first-named spring and shifting the sleeve relatively to the levers for rotating the wires and varying the spacing between the screw gripping jaws.

5. A screw driver comprising a shank having a bladed end, a pair of grip elements normally extending across opposite sides of the bladed end substantially at right angles to the longitudinal axis of the shank, said grip elements being movably connected with the shank for rotation about axes paralleling the longitudinal axis of the shank, and means associated with the shank and operatively connected with the grip elements for shifting the same to a position beyond the end of the bladed end and rotating the same about their axes.

6. A screw driver comprising a shank having a flattened end, a pair of grip elements associated with the flattened end and arranged at right angles to the longitudinal axis of the shank, means for movably connecting the grip elements with the shank for rotation about axes paralleling the longitudinal axis of the shank, and means associated with the shank and operatively connected with the grip members for rotating the same about their axes.

7. A screw driver comprising a shank having a flattened end, a pair of wires extending longitudinally of the shank and having gripping jaws arranged in operative relation with the flattened end, said wires being rotatable about their longitudinal axes and shiftable longitudinally of the shank for positioning the gripping jaws beyond the flattened end, and means associated with the shank for operating the wires.

EDWARD ALBERT ADISON.